US009733382B2

(12) United States Patent
Celepcikay et al.

(10) Patent No.: US 9,733,382 B2
(45) Date of Patent: Aug. 15, 2017

(54) DIP CORRECTION USING ESTIMATED FORMATION LAYER RESISTIVITIES

(71) Applicant: Halliburton Energy Services, Inc., Houston, TX (US)

(72) Inventors: Ferhat Turker Celepcikay, Houston, TX (US); Luis Emilio San Martin, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 79 days.

(21) Appl. No.: 14/424,090

(22) PCT Filed: Jan. 13, 2014

(86) PCT No.: PCT/US2014/011292
§ 371 (c)(1),
(2) Date: Feb. 26, 2015

(87) PCT Pub. No.: WO2015/105512
PCT Pub. Date: Jul. 16, 2015

(65) Prior Publication Data
US 2016/0018553 A1    Jan. 21, 2016

(51) Int. Cl.
*G01V 3/38* (2006.01)
*G01V 3/28* (2006.01)

(52) U.S. Cl.
CPC . *G01V 3/28* (2013.01); *G01V 3/38* (2013.01)

(58) Field of Classification Search
CPC ... G01V 3/28; G01V 3/38; G01V 3/26; G01V 3/30; G01V 5/101; G01V 5/104;
(Continued)

(56) References Cited

U.S. PATENT DOCUMENTS

| 5,675,147 A * | 10/1997 | Ekstrom | G01V 11/00 250/256 |
| 6,591,194 B1 * | 7/2003 | Yu | G01V 3/28 702/7 |

(Continued)

OTHER PUBLICATIONS

"International Application Serial No. PCT/US2014/011292, International Search Report mailed Oct. 6, 2014", 5 pgs.

(Continued)

*Primary Examiner* — Julian Huffman
*Assistant Examiner* — Michael Konczal
(74) *Attorney, Agent, or Firm* — Gilliam IP PLLC

(57) ABSTRACT

In some embodiments, an apparatus and a system, as well as a method and an article, may operate to determine apparent resistivity values of the formation associated with each of several layers comprising a set of at least three layers; to determine a resistivity correction for a selected one of the layers based on at least one of the apparent resistivity value of the selected layer, the width of the selected layer, and the apparent resistivity values in layers of the set located above and below the selected layer in the set within which the apparent resistivity value was obtained; and to generate a dip corrected resistivity value associated with the selected layer, based on the resistivity correction. Methods described herein may operate without using inversion-based or filter-based methods of dip correction. Additional apparatus, systems, and methods are disclosed.

18 Claims, 13 Drawing Sheets

(58) Field of Classification Search
CPC ...... G01V 5/107; G01V 9/00; G01V 2200/00; E21B 41/0092; E21B 47/02216; E21B 47/00; E21B 49/00
USPC .......................................................... 324/339
See application file for complete search history.

(56) References Cited

U.S. PATENT DOCUMENTS

| | | | |
|---|---|---|---|
| 6,885,943 B2 | 4/2005 | Bittar | |
| 9,354,353 B2* | 5/2016 | Celepcikay | G01V 3/38 |
| 2002/0173914 A1 | 11/2002 | Zhang et al. | |
| 2004/0059513 A1* | 3/2004 | Bittar | G01V 3/38 |
| | | | 702/7 |
| 2005/0049792 A1* | 3/2005 | Yu | G01V 3/28 |
| | | | 702/7 |
| 2009/0192714 A1* | 7/2009 | Xue | G01V 3/28 |
| | | | 702/7 |
| 2010/0127708 A1 | 5/2010 | Bittar | |
| 2010/0161228 A1 | 6/2010 | Heliot et al. | |
| 2013/0080058 A1 | 3/2013 | Wu et al. | |

OTHER PUBLICATIONS

"International Application Serial No. PCT/US2014/011292, Written Opinion mailed Oct. 6, 2014", 9 pgs.

\* cited by examiner

DIP CORRECTION USING ESTIMATED FORMATION LAYER RESISTIVITIES

PRIORITY APPLICATIONS

This application is a U.S. National Stage Filing under 35 U.S.C. 371 from International Application No. PCT/US2014/011292, filed on Jan. 13, 2014, which application and publication are incorporated herein by reference in their entirety.

BACKGROUND

Understanding the structure and properties of geological formations is important for a wide variety of applications in well and reservoir management, monitoring, and remediation. Measurement devices, such as induction logging tools, can make measurements in a borehole or formation (i.e., down hole measurements) to provide data to aid in attaining this understanding.

Induction logging tools can have multiple arrays of sensors to measure formations at different depths of investigation, and processing systems can generate resistivity logs based on these measurements. However, in deviated wells, these logs can be inaccurate because of the relative amount of dip between the formation layers and the borehole axis. Available methods to correct resistivity logs based on relative dip have large computational costs.

DETAILED DESCRIPTION

To address some of the challenges described above, as well as others, apparatus, systems, and methods are described herein to use a dip correction algorithm to process induction data collected by induction tools. This dip correction algorithm can perform dip correction without using computationally expensive inversion-based algorithms or relatively inaccurate filter-based algorithms, while providing sufficient accuracy to direct drilling operations, as well as controlling the operation of various apparatus and systems.

Figure 1:
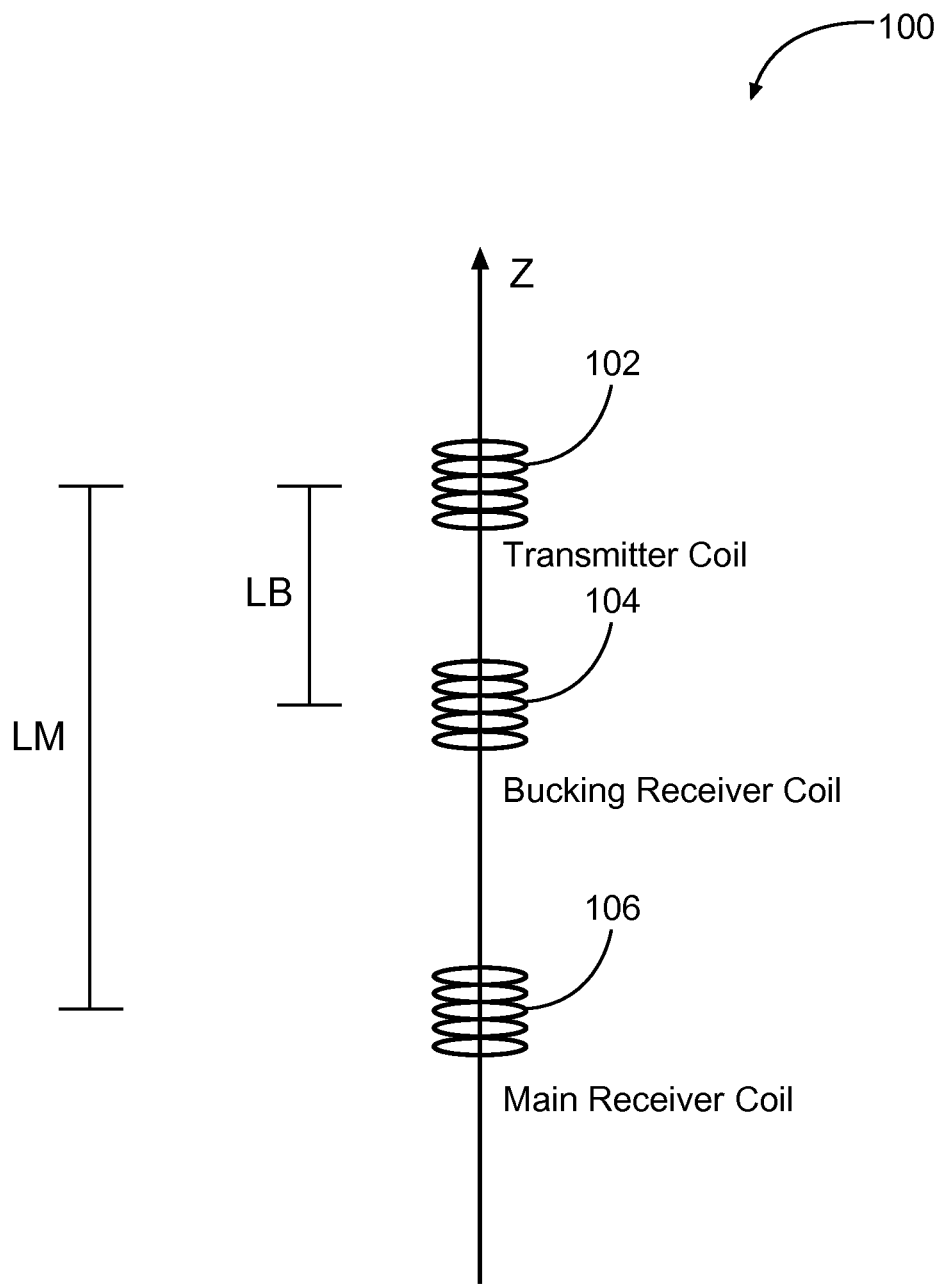
FIG. 1 illustrates an example array coil element in accordance with some embodiments.

FIG. 1 illustrates an example array coil element 100 in accordance with some embodiments. The array coil element 100 can help provide measurement signals for use in the processing techniques disclosed herein. The array coil element 100 includes a transmitter coil 102 oriented along a z-axis direction, along with a bucking receiver coil 104 and a main receiver coil 106 having similar orientations.

The main receiver coil 106 and bucking receiver coil collect electromagnetic signals from a surrounding formation that is excited by the transmitter coil 102. The bucking receiver coil 104 can cancel out mutual inductance between the transmitter coil 102 and the main receiver coil 106 to obtain a better measurement of the formation response. A distance of about $L_M$ can separate the main receiver coil 106 from the transmitter coil 102. A distance of about $L_B$ can separate the bucking receiver coil 104 from the transmitter coil 102, where the distance $L_M$ is typically but not necessarily greater than $L_B$.

Figure 2:
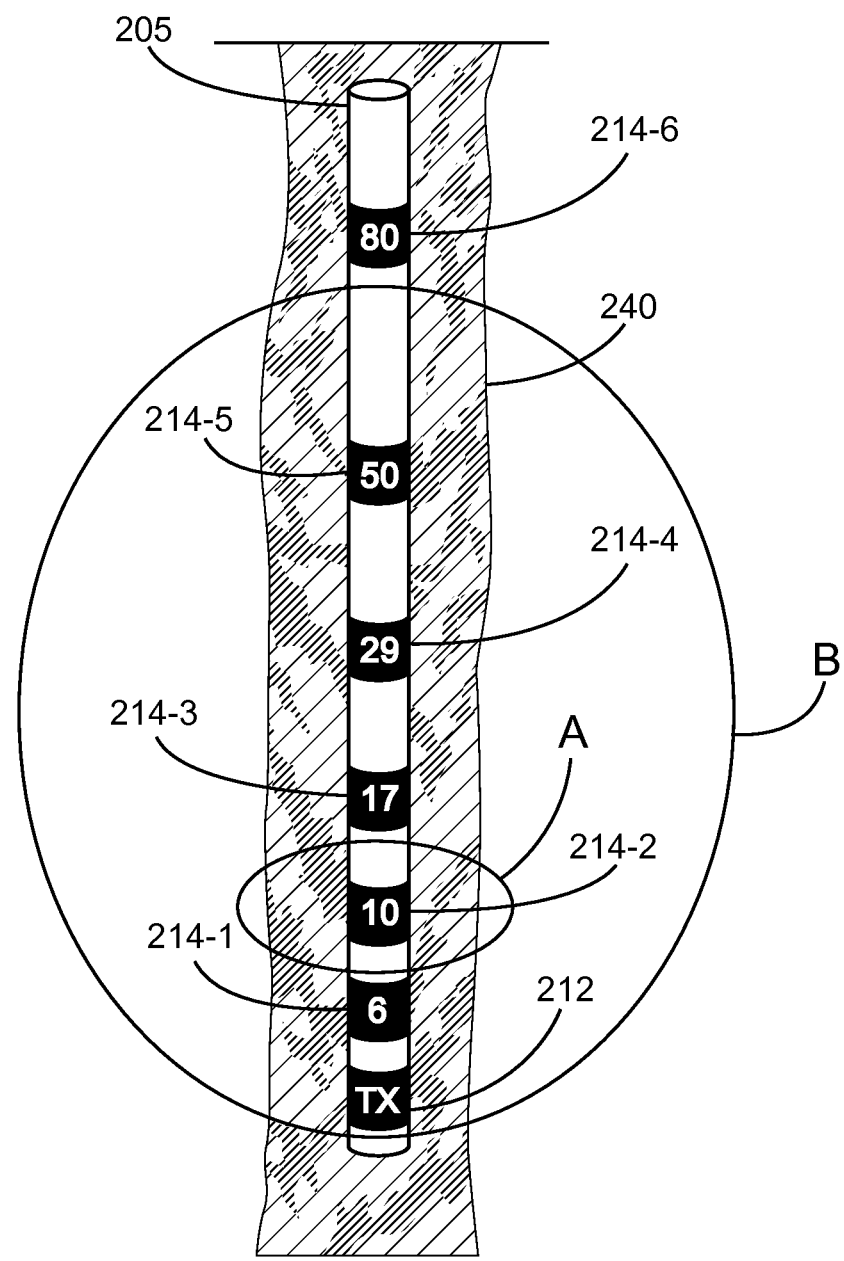
FIG. 2 illustrates an array induction tool in accordance with some embodiments.

FIG. 2 illustrates an induction tool 205 in accordance with some embodiments. The induction tool 205 can be disposed in an annular area 240 and have one or more receivers 214-1, 214-2, 214-3, 214-4, 214-5, and 214-6 located at various distances from the transmitter 212 to measure properties of a formation at a multiplicity of depths of investigation.

In the illustrated example, the receiver 214-1 is located at about 6 inches from the transmitter 212. The receiver 214-2 is located about 10 inches from the transmitter 212. The receiver 214-3 is located about 17 inches from the transmitter 212. The receiver 214-4 is located about 29 inches from the transmitter 212. The receiver 214-5 is located about 50 inches from the transmitter 212. The receiver 214-6 is located about 80 inches from the transmitter 212.

A receiver, for example the receiver 214-1, that is closer to the transmitter 212 may be more sensitive to conditions of areas of the formation that are closer to the borehole wall than, for example, the receiver 214-6 that is further from the transmitter 212. On the other hand, receiver 214-6 that is further away from the transmitter 212 than, for example, the receiver 214-1, can be relatively more sensitive to conditions of areas that are located deeper in the formation, rather than those that are closer to the borehole wall. While one transmitter 212 and six receivers 214-1, 214-2, 214-3, 214-4, 214-5, and 214-6 are shown in the figure, various embodiments are not limited thereto, and the induction tool 205 can include any number of receivers and transmitters.

The induction tool 205 can provide data to help generate induction logs at different depths of investigation and different vertical resolutions. However, these logs may include inaccurate results in the presence of a dip angle, because of variations in signal responses of the receivers 214-1, 214-2, 214-3, 214-4, 214-5, and 214-6 caused by the relative amount of dip (the "dip") between the formation layers and the borehole axis. For this reason, some available systems implement dip correction algorithms.

While two-dimensional (2D) or three-dimensional (3D) inversion methods or filter methods can perform dip correction, such methods are either computationally expensive, consuming significant computer resources, or have less than satisfactory accuracy. More specifically, a full parameterization to remove adverse skin, borehole, and shoulder bed effects is a computationally expensive 3D problem. Available methods may not yield satisfactory results for highly deviated wells.

To reduce computational expense and processing time, some embodiments provide systems and methods that correct log data for the presence of dip by neglecting higher order interactions between some effects, and removing other effects in sequential operations.

Figure 3:
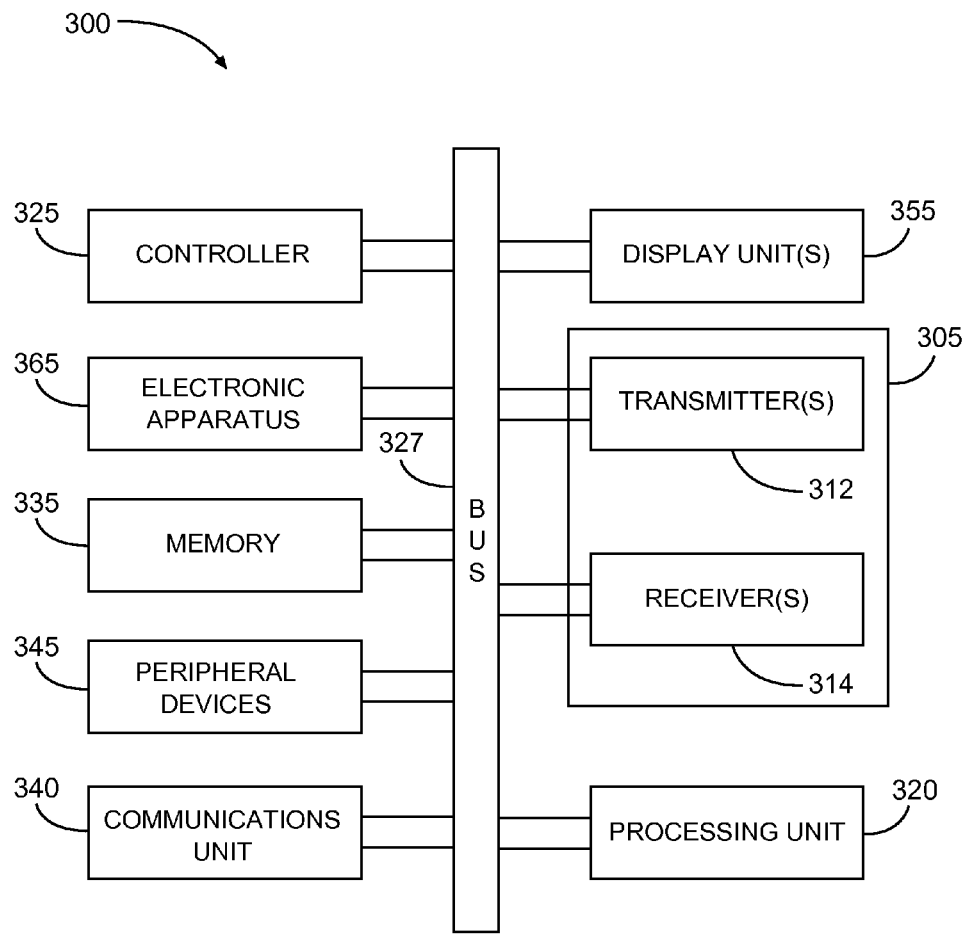
FIG. 3 depicts a block diagram of features of a logging system in accordance with some embodiments.

FIG. 3 depicts a block diagram of features of a logging system 300 in accordance with various embodiments. The logging system 300 can provide dip correction as described below.

The logging system 300 includes an induction tool 305 having an arrangement of transmitter antenna(s) 312 and receiver antenna(s) 314 operable in a wellbore. The arrangements of the transmitter antenna(s) 312 and the receiver antenna(s) 314 of the induction tool 305 may be similar to or identical to the various arrangements discussed herein. For example, the induction tool 305 can propagate energy at a plurality of frequencies into a formation, and provide a plurality of raw measurements of a formation parameter responsive to the propagated energy. The induction tool 305 can include an array induction tool as described above with respect to FIGS. 1 and 2 or the induction tool 305 can include an MCI tool. An example of such a tool might include a Halliburton Xaminer™ tool, available from the Halliburton Company of Houston, Tex. and described in more detail below with respect to FIG. 11.

The processing unit 320 can couple to the induction tool 305 to obtain measurements from the induction tool 305. The processing unit 320 can perform the operations to perform dip correction as will be described in more detail below.

Figure 4:
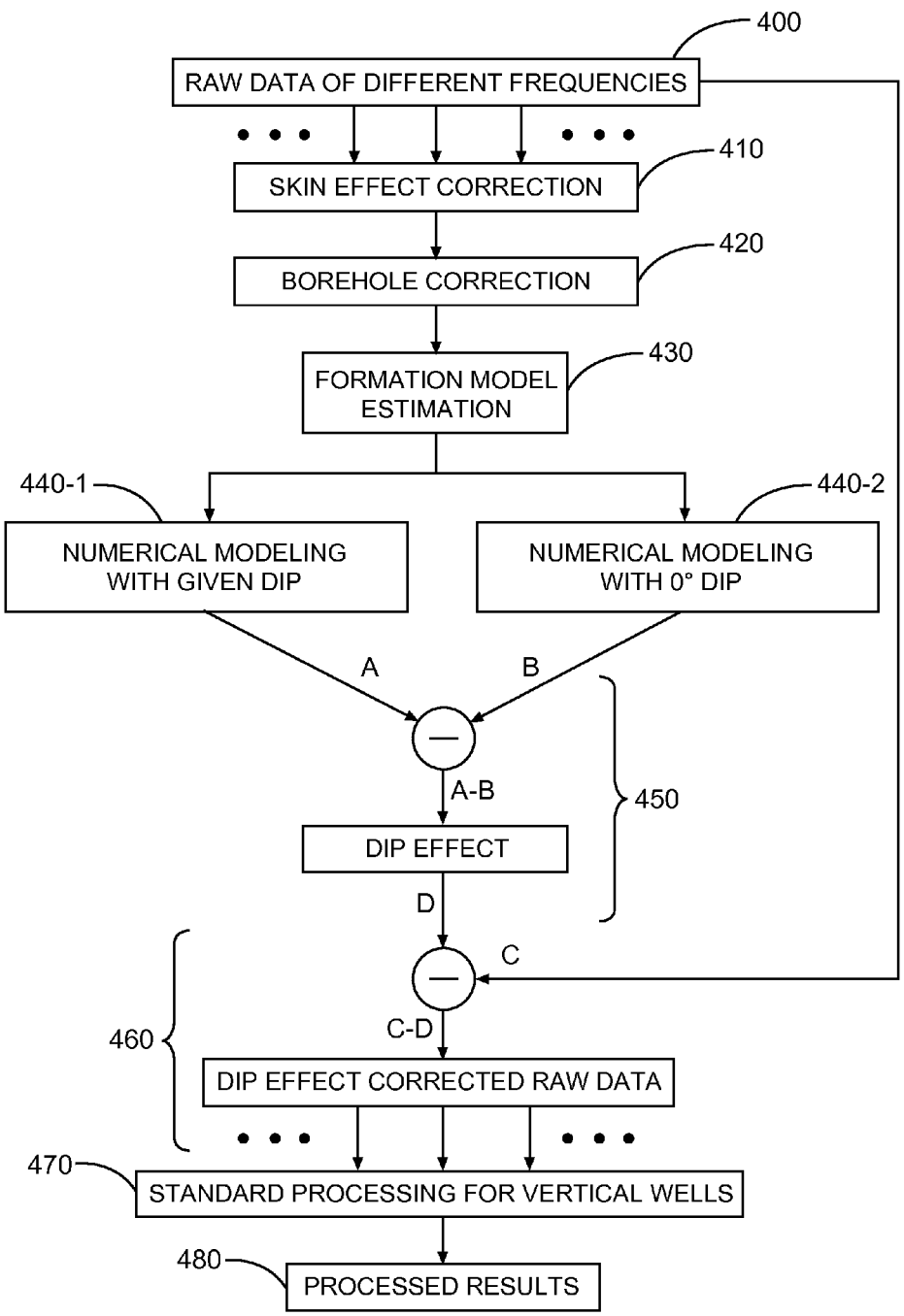
FIG. 4 illustrates a flow diagram of a dip effect correction algorithm in accordance with some embodiments.

FIG. 4 illustrates a flow diagram of a dip effect correction algorithm in accordance with some embodiments. Using this algorithm, various embodiments can perform dip effect correction without applying computationally expensive inversion methods or relatively inaccurate filter-based methods.

Referring now to FIGS. 3 and 4, in operation 400, the processing unit 320 obtains raw data from the induction tool 305, performs calibration and temperature correction, and outputs data of multiple frequencies. In operations 410 and 420, the processing unit 320 removes the skin effect and the borehole effect by using associated skin effect correction and borehole effect correction algorithms, respectively. In some embodiments, the processing unit 320 performs removal of the skin effect through a combination of multiple frequency measurements from receivers of the induction tool 305. The combination of the multiple frequency data not only allows for the removal of the skin depth effect, but also improves the robustness of the dip correction algorithm.

In operation 430, the processing unit 320 generates a formation model. In various embodiments, the processing unit 320 estimates various parameters of the formation model such as resistivity of formation layers, boundary position of formation layers, dip angle of formation layers or resistivity anisotropy ratio of formation layers. The processing unit 320 can use an algorithm, described below with respect to FIG. 5, to generate the formation model.

Figure 5:
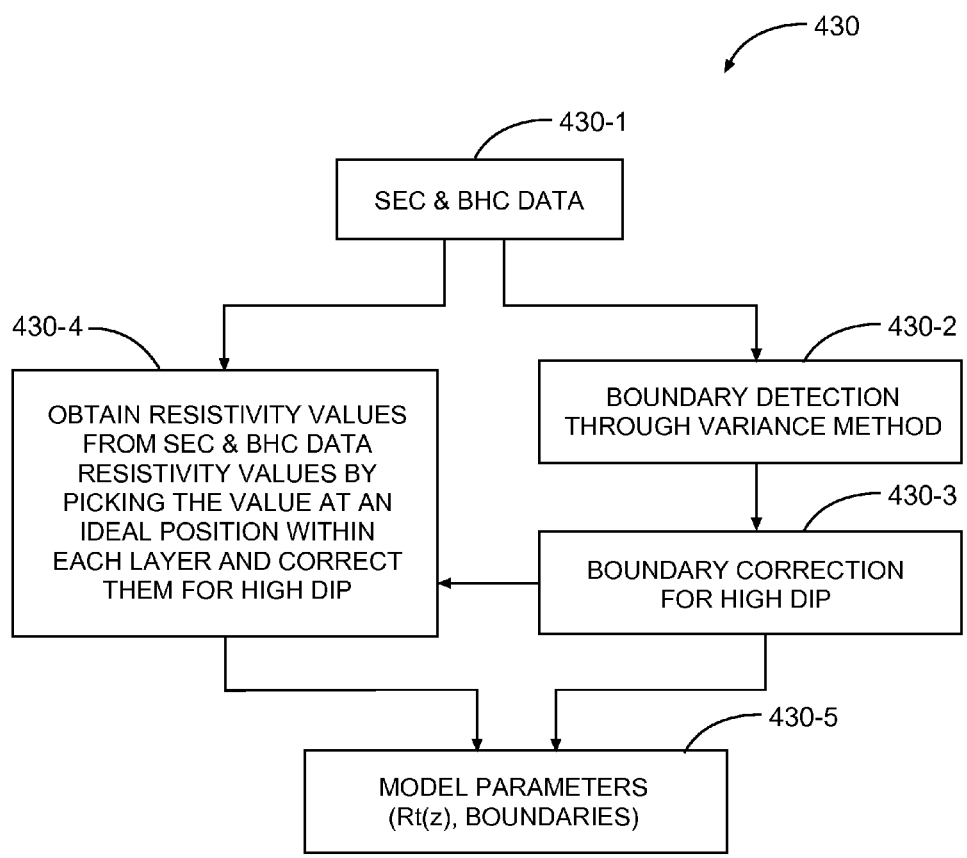
FIG. 5 illustrates a flow diagram of formation model estimation in accordance with some embodiments.

FIG. 5 illustrates a flow diagram of formation model estimation in accordance with some embodiments. The formation model estimation of FIG. 5 can provide the same or similar functionality as operation 430 (FIG. 4).

In operation 430-1, the processing unit 320 receives, as input, data that has been skin-effect corrected (SEC) and borehole corrected (BHC). This data is output to operations 430-4 and 430-2 described herein.

In operation 430-2, the processing unit 320 performs boundary detection on the received SEC and BHC data to generate initial boundary positions. In various embodiments, the processing unit 320 uses a variance method for boundary detection, although embodiments are not limited thereto.

For example, the variance method can include operations of first defining a window of n points (e.g. n=5) around a point in a log, in the illustrative example an $i^{th}$ log point. Then, the average of those n points is computed within the window according to:

$$a_i = \frac{1}{n} \sum_{j=i-n/2}^{i+n/2} (\sigma_j) \quad (1)$$

where $\sigma_j$ is conductivity values at the jth depth point. Next, the variance is computed at the ith depth point using the expression $$v_i^2 = \frac{1}{n} \sum_{j=i-n/2}^{i+n/2} [(\sigma_j) - a_i]^2 \quad (2)$$

This variance value is assigned to the ith depth point. By repeating the process for all depths, the variance curve is computed. Boundaries are determined by choosing the corresponding peaks in the variance curve.

An example variance method can include determining a boundary location at a point where a resistivity, obtained from the received SEC and BHC data, varies by a certain threshold amount from one side of the determined boundary location to the other side of the determined boundary location.

In operation 430-3, the processing unit 320 adjusts boundary positions resulting from operation 430-2 if the amount of dip is higher than a threshold. Thus, processing unit 320 determines positions of boundaries in operations 430-2 and 430-3.

In operation 430-4, the processing unit 320 obtains formation resistivity values from the received SEC and BHC data resistivity values, based on boundaries determined in operations 430-2 and 430-3. In various embodiments, the processing unit 320 can use a heuristic correction method in operations 430-3 or 430-4. In various other embodiments, the processing unit 320 can use a lookup table to find a relevant correction, where the lookup table may have been saved or generated previously based on historical or experimental data, or other knowledge, of the geographical area or a similar geographical area. Various embodiments are not limited to any particular correction method.

Figure 6:
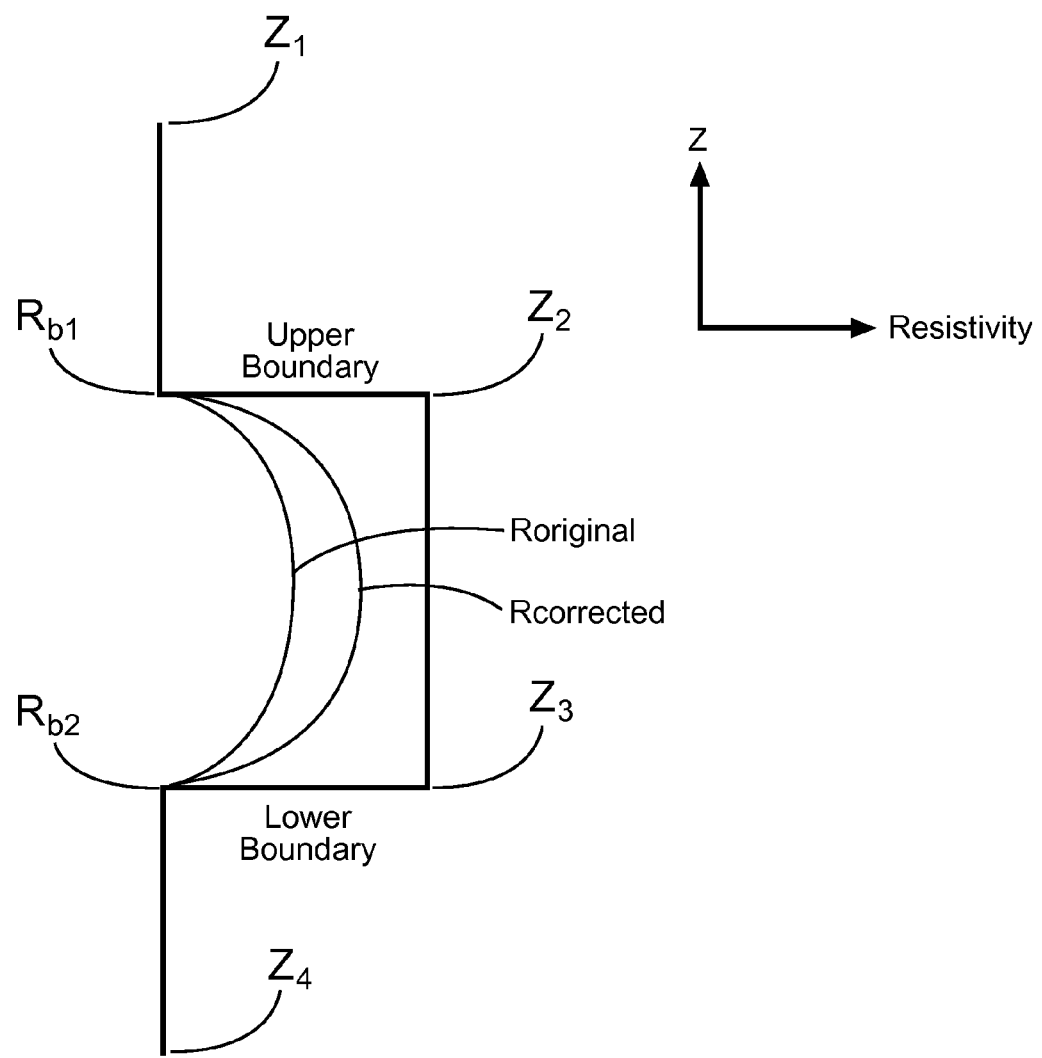
FIG. 6 illustrates example resistivities and formation layers associated with correcting formation resistivity values in accordance with some embodiments.

FIG. 6 illustrates example resistivities and formation layers associated with correcting resistivity values in accordance with some embodiments. The processing unit 320 can execute or implement operation 430-4 (FIG. 5) using a similar layer configuration as that depicted in FIG. 6.

A formation can have layers at or substantially at coordinates $z_1$, $z_2$, $z_3$, and $z_4$ and these layers can have resistivities. The processing unit 320 can obtain coordinates $z_1$, $z_2$, $z_3$, and $z_4$ and resistivities through an inversion process or other process such as filtering. However, these processes can be computationally expensive or less than satisfactory.

Accordingly, in various embodiments, the processing unit 320 can estimate these values using, for example, correction methods described below.

Using the SEC and BHC resistivity values received in operation 430-1 (FIG. 5), and boundaries determined in operation 430-2 (FIG. 5), the processing unit 320 can determine a resistivity value $R_{b1}$ at an upper boundary and a second resistivity value $R_{b2}$ at a lower boundary. The processing unit 320 can use resistivity log data obtained from the shortest array of an induction tool 305 because the shortest array has the least effect from upper and lower layer boundaries. However, embodiments are not limited to use of a midpoint of the middle layer, and the processing unit 320 can select any other point, an average of points, or a combination thereof for resistivity correction. Further, embodiments are not limited to using resistivities of layers immediately adjacent to the middle layer. Rather, the processing unit 320 can use resistivity values corresponding to layers further away from the middle layer. However, resistivity values of the middle layer may be less sensitive to the resistivity of layers further away from the middle layer, leading to a less accurate resistivity correction than if the processing unit 320 used resistivities of layers immediately adjacent to the middle layer.

The processing unit 320 can, based on a heuristic rule, adjust an estimated resistivity $R_{original}$, for a middle layer between the upper boundary and the lower boundary, to $R_{corrected}$. $R_{original}$ can represent a first estimate of resistivity of the middle layer. $R_{corrected}$ can represent a correction to that estimate, based on heuristic correction, lookup table correction, etc. The adjustment may be a multiplication, addition, or other numerical adjustment. The heuristic rule can be based on absolute or relative values of $R_{b1}$, $R_{b2}$, or $R_{original}$, on absolute or relative thickness of layers, or on ratios between $R_{b1}$, $R_{b2}$, or $R_{original}$, for example, although embodiments are not limited thereto. As an example, $R_{corrected}$ can be based on a ratio such as $\max(R_{b1}, R_{b2})/R_{original}$.

In some embodiments, the processing unit 320 can examine a lookup table to determine an appropriate resistivity correction should be for particular upper and lower layer resistivity values, thicknesses, or any other parameter or combination of parameters. The processing unit 320 can use $R_{corrected}$ for further operations described below.

Referring again to FIG. 5, the processing unit 320 outputs model parameters in operation 430-5. Model parameters can include layer resistivities and boundary locations.

Referring again to FIG. 4, in operations 440-1 and 440-2, the processing unit uses the model parameters obtained in operation 430-5 (FIG. 5) to perform forward modeling.

In operation 440-1, in some embodiments, the processing unit 320 performs forward modeling using a dip angle value for the formation, to obtain a first sub-model. The processing unit 320 can select, estimate, or otherwise obtain the dip angle. For example, the processing unit 320 can acquire a dip value for the geographical location of interest from, for example, peripheral devices 345 of the logging system 300. Additionally, in operation 440-2, the processing unit 320 performs forward modeling using a zero-degree dip value to create a second sub-model.

In operation 450, the processing unit 320 generates a dip correction. The processing unit 320 can use one of at least two dip correction methods. These dip correction methods can include an additive method and a multiplicative method, although embodiments are not limited thereto. The multiplicative method may provide improved correction relative to the additive method. In this regard, in various embodiments, the processing unit 320 can calculate an additive correction factor and a multiplicative correction factor. For example, in some embodiments, the processing unit 320 can add or subtract results of operations 440-1 and 440-2 to determine an additive correction factor. In other embodiments, the processing unit 320 can multiply or divide results of operations 440-1 and 440-2 to determine a multiplicative correction factor. In further embodiments, processing unit 320 can switch between additive or multiplicative correction based on expected accuracy of each type of correction.

In operation 460, the processing unit 320 can apply corrections to raw data. For example, the processing unit 320 can add or subtract the result of operation 450 from raw data of different frequencies, which the processing unit 320 obtained in operation 400, to generate additive dip effect corrected data. In other embodiments, the processing unit 320 can multiply or divide the result of operation 450 by or into raw data of different frequencies to generate multiplicative dip effect corrected data. In some embodiments, to further increase computational speed, the processing unit 320 computes the effect of relative dip on the induction logs for a subset of receivers or for one receiver, and applies the computed dip correction to other receivers.

In operation 470, the processing unit 320 can perform processing of the dip-effect corrected raw data, according to methods for vertical well processing known to those of ordinary skill in the art. In operation 480, the processing unit 320 produces results, for example dip-corrected resistivity logs, processed according to standard processing for vertical wells.

Figure 7:
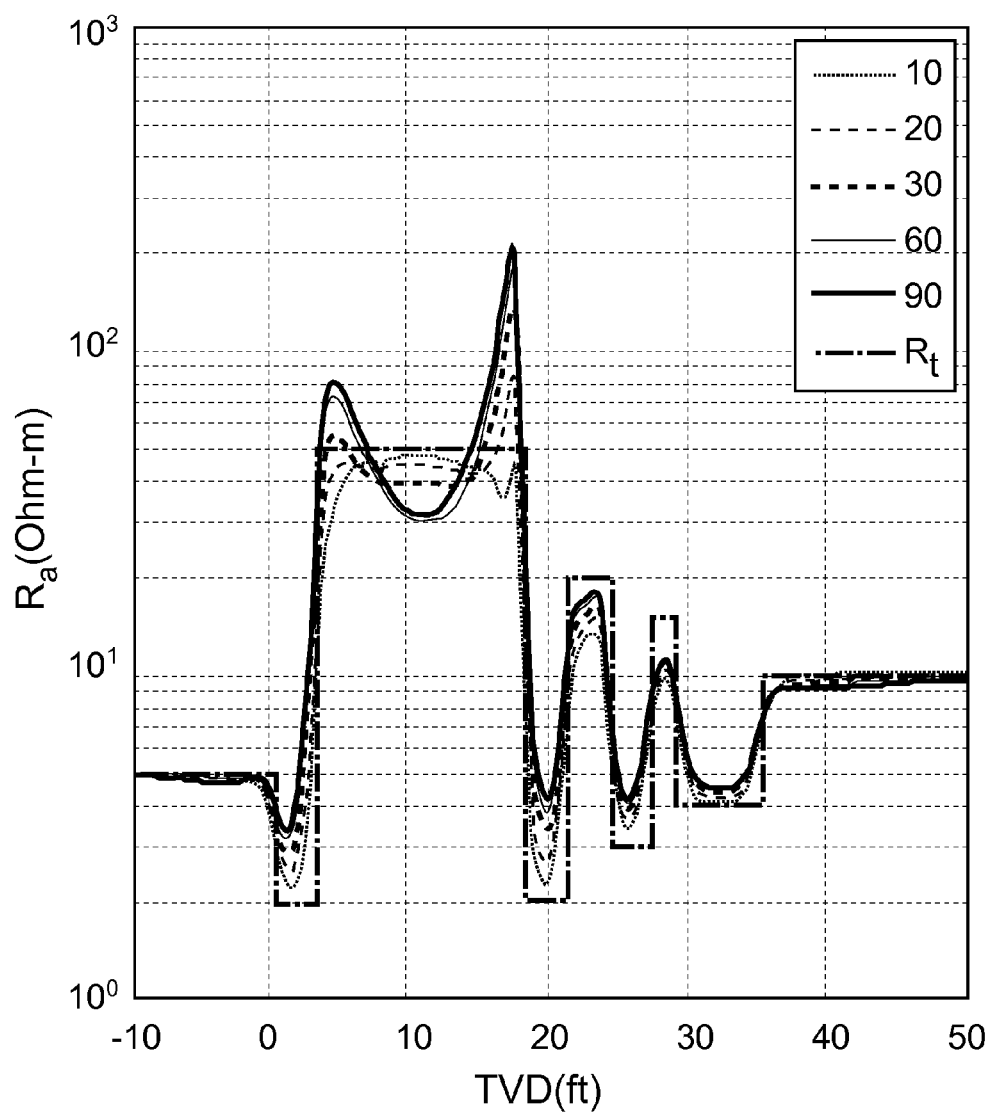
FIG. 7 illustrates an example of resistivity curves processed with a dip, as a reference to illustrate the accuracy of some embodiments.

FIG. 7 illustrates an example of resistivity logs processed with a dip of 75 degrees, as a reference to illustrate accuracy of some embodiments. FIG. 7 shows resistivity curves at various depths of investigation, for example 10 inches, 20 inches, 30 inches, 60 inches, and 90 inches. $R_t$ is the true resistivity.

Figure 8:
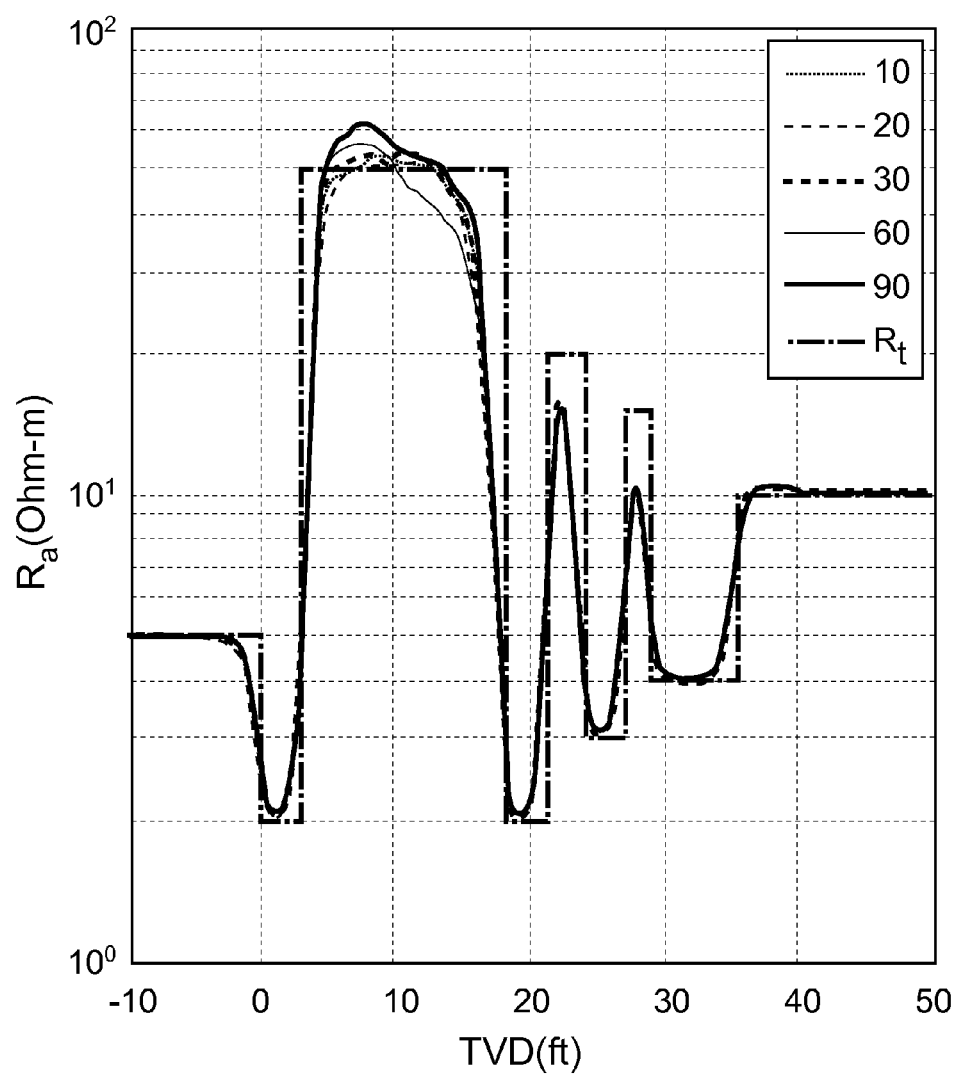
FIG. 8 illustrates an example of resistivity curves processed with no dip, as a reference to illustrate the accuracy of some embodiments.

FIG. 8 illustrates an example of resistivity logs processed with no dip, as a reference to illustrate accuracy of some embodiments. FIG. 8 shows resistivity curves at various depths of investigation, for example 10 inches, 20 inches, 30 inches, 60 inches, and 90 inches. $R_t$ is the true resistivity.

Figure 9:
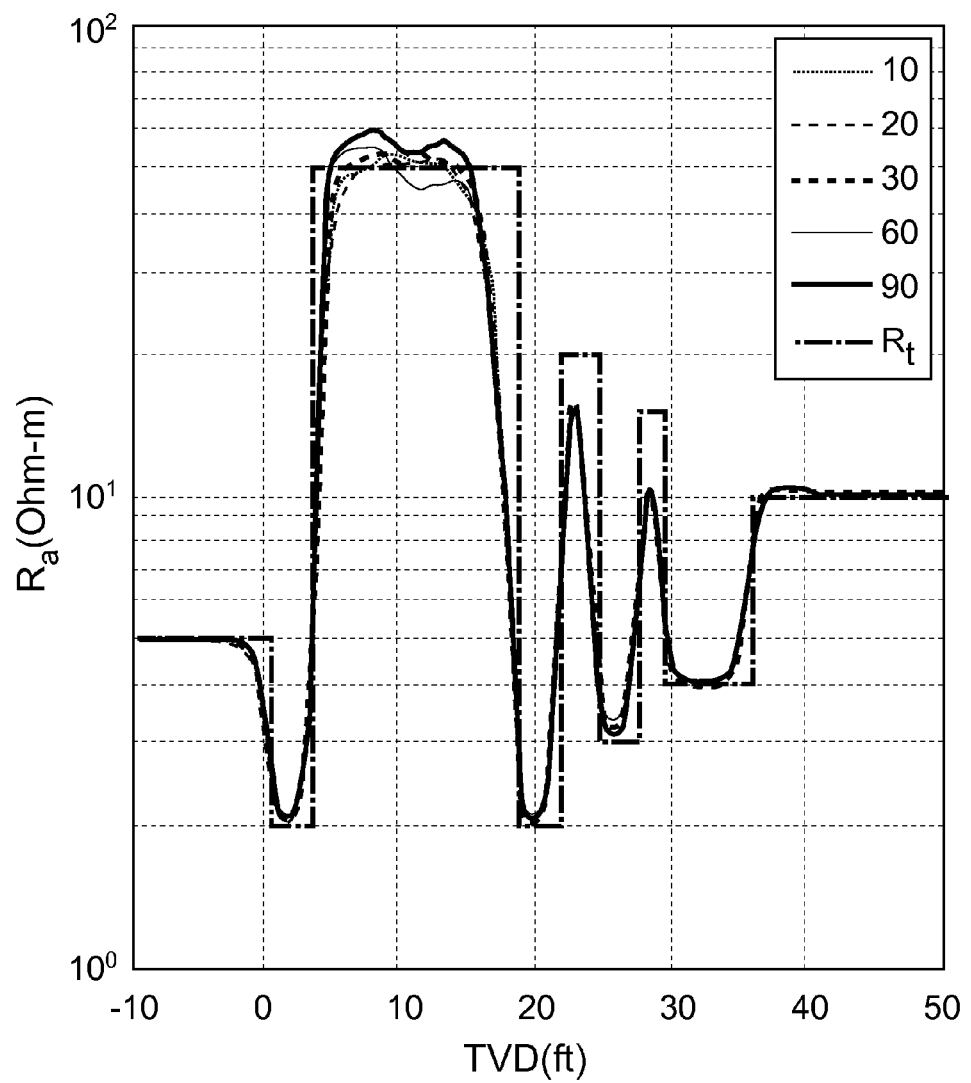
FIG. 9 illustrates an example of dip corrected resistivity logs corrected using inversion, as a reference to illustrate accuracy of some embodiments.

FIG. 9 illustrates an example of dip corrected resistivity logs corrected using inversion, as a reference to illustrate accuracy of some embodiments. FIG. 9 shows dip-corrected curves at various depths of investigation, for example 10 inches, 20 inches, 30 inches, 60 inches, and 90 inches. $R_t$ is the true resistivity. In the example shown in FIG. 9, the formation has a dip, and dip correction has been applied to the resistivity logs. If the dip correction is accurate, the resistivity curves at the various depths of investigation should match or nearly match the resistivity logs in FIG. 8.

Figure 10:
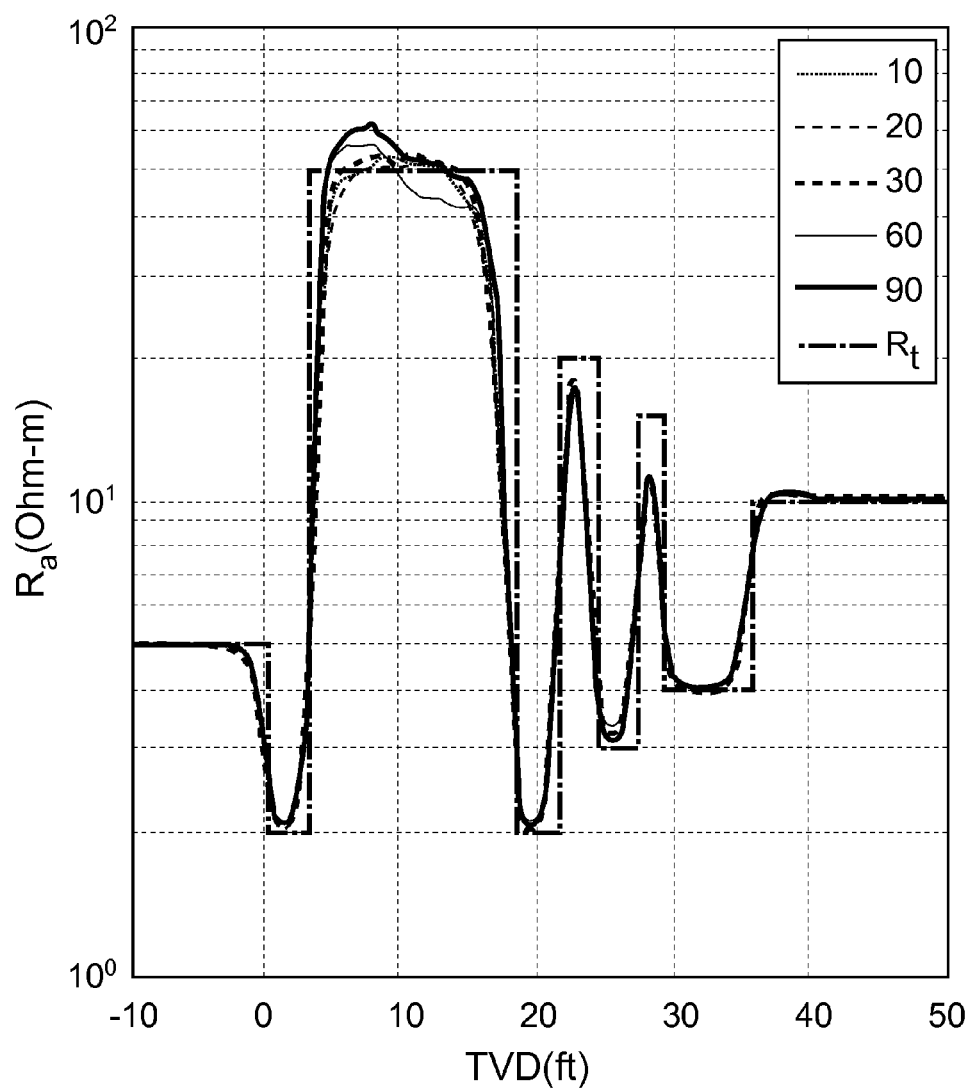
FIG. 10 illustrates an example of dip correction without the use of inversion in accordance with some embodiments.

FIG. 10 illustrates an example of dip correction without use of inversion in accordance with some embodiments. Upon comparing FIG. 9 and FIG. 10 with reference FIG. 8, it can be seen that dip-corrected curves, where dip correction is performed without using computationally expensive inversion, can be very similar to dip correction performed with inversion. An example table demonstrates efficiency of the dip correction method described herein compared to inversion-based dip correction methods:

TABLE 1

Comparison of dip correction methods.

| Formation type | Dip correction method | Inversion time | Dip correction time | Total time |
|---|---|---|---|---|
| 9-layer formation (60 feet) | No inversion | NA | 361.1525 | 361.1525 |
| 9-layer formation (60 feet) | Inversion-based | 944.3125 | 359.7343 | 1304.0468 |
| Oklahoma formation (210 feet) | No-inversion | NA | 860.4055 | 860.4055 |
| Oklahoma formation (210 feet) | Inversion-based | 7941.8752 | 878.5625 | 8820.4377 |

In various embodiments, the processing unit 320 can apply dip correction algorithms described herein to signals received by MCI tools, such as the Halliburton Xaminer™ tool. Other MCI tools that provide signals to dip correction algorithms of some embodiments can include, for example, a Baker Hughes 3D eXplorer (3DeX™), available from Baker Hughes, Inc. of Houston, Tex., or a Schlumberger Rt Scanner™, available from Schlumberger Limited of Houston, Tex.

Figure 11:
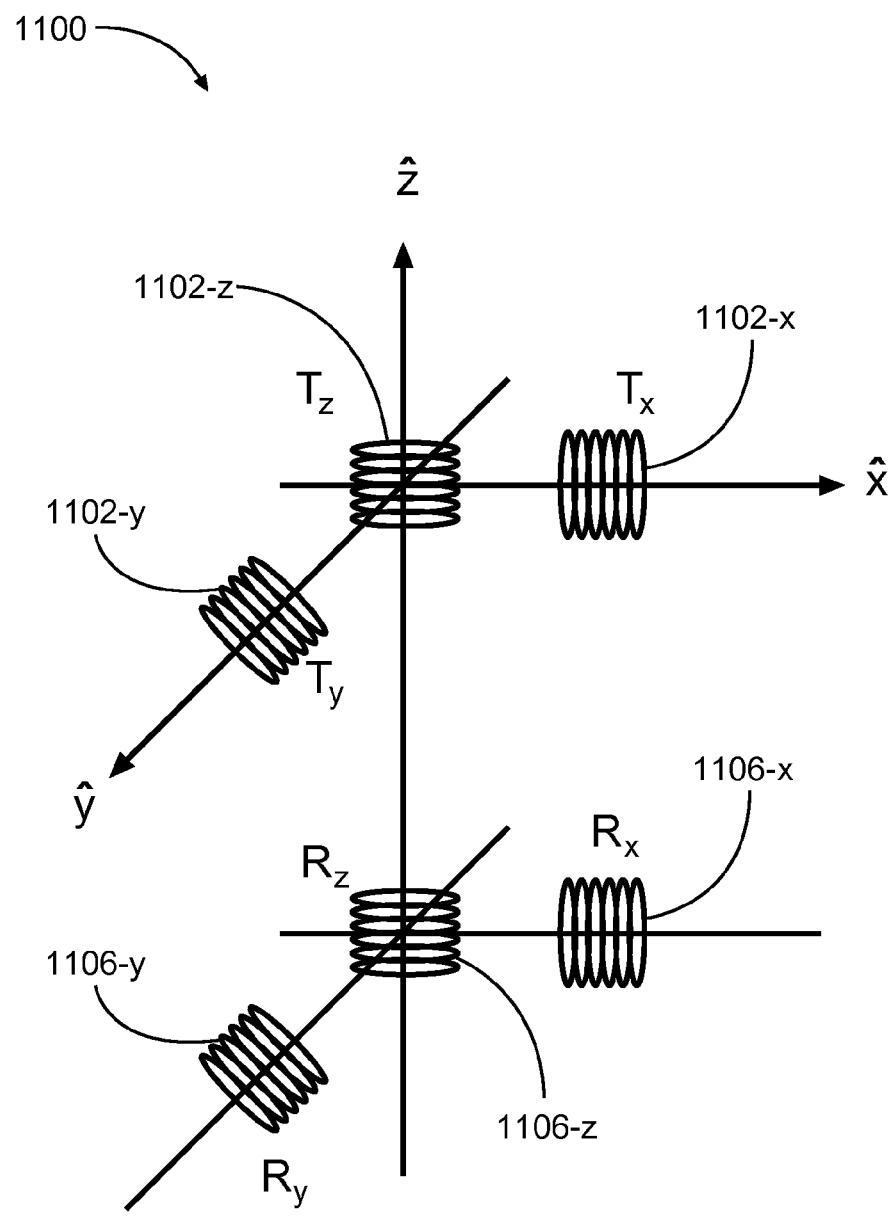
FIG. 11 illustrates multi-component induction (MCI) tool transmitter and receiver orientations in accordance with some embodiments.

FIG. 11 illustrates MCI tool 1100 transmitter and receiver directions in accordance with some embodiments. A system, for example the logging system 300 (FIG. 3) can employ the MCI tool 1100 as a logging tool to provide measurement signals for use in processing techniques disclosed herein. For example, the MCI tool 1100 may perform at least some of the functionalities of the induction tool 305. The MCI tool 1100 includes a triad of transmitter coils 1102-$x$, 1102-$y$, and 1102-$z$ oriented along x-, y-, and z-directions respectively and a triad of receiver coils 1106-$x$, 1106-$y$, and 1106-$z$ with similar orientations. The MCI tool 1100 can also include bucking receiver coils (not shown in FIG. 11). The receiver coils 1106-$x$, 1106-$y$, and 1106-$z$ collect electromagnetic signals from a surrounding formation that is excited by the transmitter coils 1102-$x$, 1102-$y$, and 1102-$z$. The MCI tool 1100 can include a single axis, for example z-axis, transmitter and receiver coil array (not shown in FIG. 11) oriented in only one direction, for example along the z-direction, in addition to the triads described above. The z-axis transmitter and receiver coil array can be separate from the MCI tool 1100 or housed in the MCI tool 1100.

For each receiver coil 1106-$x$, 1106-$y$, and 1106-$z$ operating at a substantially fixed frequency, a combination of components from the acquired signals is generated, where the components correspond to components of an apparent conductivity tensor. The combination of components can include xx, yy, and zz components or the combination of components can include cross-coupling components.

In some embodiments, the processing unit 320 can apply algorithms described herein to coupling signals between the xx, yy, or zz coupling components. In at least these embodiments, the processing unit 320 can estimate formation parameters based on xx, yy, or zz components in operation 430 (FIG. 4). The processing unit 320 can calculate corrections for any of the nine coupling components (xx, xy, xz, yx, yy, yz, zx, zy, and zz) using modeling for that particular component.

Referring again to FIG. 3, the logging system 300 can additionally include a controller 325, a memory 335, an electronic apparatus 365, and a communications unit 340. The controller 325 and the memory 335 can be programmed to operate the induction tool 305 to acquire measurement data as the induction tool 305 is operated. The controller 325 and the memory 335 can be programmed to control activation of selected ones of the transmitter antennas 312 and data acquisition by selected one of the receiver antennas 314 in the induction tool 305 and to manage processing schemes with respect to data derivable from measurements using the induction tool 305 as described herein. The memory 335 can store measurements of the formation parameter or any other data such as a look-up table to associate resistivity corrections with widths of formation layers as described above with respect to FIGS. 4 and 5. The memory 335 may include a database, for example a relational database, with data stored therein to represent, for example, a lookup table for resistivity correction as described above.

The electronic apparatus 365 can be used in conjunction with the controller 325 to perform tasks associated with taking measurements downhole with the transmitter antenna(s) 314 and the receiver antenna(s) 312 of the induction tool 305. The communications unit 340 can include downhole communications in a drilling operation. Such downhole communications can include a telemetry system.

The logging system 300 can also include a bus 327, where the bus 327 provides electrical conductivity among the components of the logging system 300. The bus 327 can include an address bus, a data bus, and a control bus, each independently configured. The bus 327 can also use common conductive lines for providing one or more of address, data, or control, the use of which can be regulated by the controller 325. The bus 327 can include instrumentality for a communication network. The bus 327 can be configured such that the components of the logging system 300 are distributed. Such distribution can be arranged between downhole components such as the transmitter antenna(s) 312 and the receiver antenna(s) 314 of the induction tool 305 and components that can be disposed on the surface of a well. Alternatively, various ones of these components can be co-located, such as on one or more collars of a drill string or on a wireline structure.

In various embodiments, the logging system 300 comprises peripheral devices 345 that can include displays, user input devices, additional storage memory, and control devices that may operate in conjunction with the controller 325 or the memory 335. For example, the peripheral devices 345 can include a user input device to receive user input responsive to providing display data representative of the dip-corrected log and to provide further commands or signals to other components of the logging system 300 or another system, based on the user input, or input from a database or lookup table for controlling operations such as drilling operations. The peripheral devices 345 can include a display for displaying data representative of the dip-corrected log, formation parameters, corrected dip angles, or for displaying any other data.

In an embodiment, the controller 325 can be realized as one or more processors. The peripheral devices 345 can be arranged to operate in conjunction with display unit(s) 355 with instructions stored in the memory 335 to implement a graphical user interface (GUI) to manage the operation of the induction tool 305 or components distributed within the logging system 300. A GUI can operate in conjunction with the communications unit 340 and the bus 327. The induction tool 305 such include various components of the logging system 300 so that processing identical to or similar to the processing schemes discussed with respect to various embodiments herein can be performed downhole.

In various embodiments, a non-transitory machine-readable storage device can comprise instructions stored thereon, which, when performed by a machine, cause the machine to perform operations, the operations comprising one or more features similar to or identical to features of methods and techniques described herein. A machine-readable storage device, herein, is a physical device that stores data represented by physical structure within the device. Examples of machine-readable storage devices can include, but are not limited to, memory 335 in the form of read only memory (ROM), random access memory (RAM), a magnetic disk storage device, an optical storage device, a flash memory, and other electronic, magnetic, or optical memory devices, including combinations thereof.

One or more processors such as, for example, the processing unit 320, can operate on the physical structure of such instructions. Executing these instructions determined by the physical structures can cause the machine to perform operations to obtain a dip angle in the formation and resistivity values in the formation at each of several layers comprising a set of at least three layers; to determine a resistivity correction for a selected one of the resistivity values based on a measured resistivity value of the selected one, the width of the layer in the set within which the measured resistivity value was obtained, and the resistivity values in layers of the set located above and below the layer in the set within which the measured resistivity value was obtained; and to generate a model of the formation to generate a correction of the dip angle based on the resistivity correction.

The instructions can include instructions to cause the processing unit 320 to perform any of, or a portion of, the above-described operations in parallel with performance of any other portion of the above-described operations. The processing unit 320 can store, in memory 335, any or all of the data received from the induction tool 305.

Figure 12:
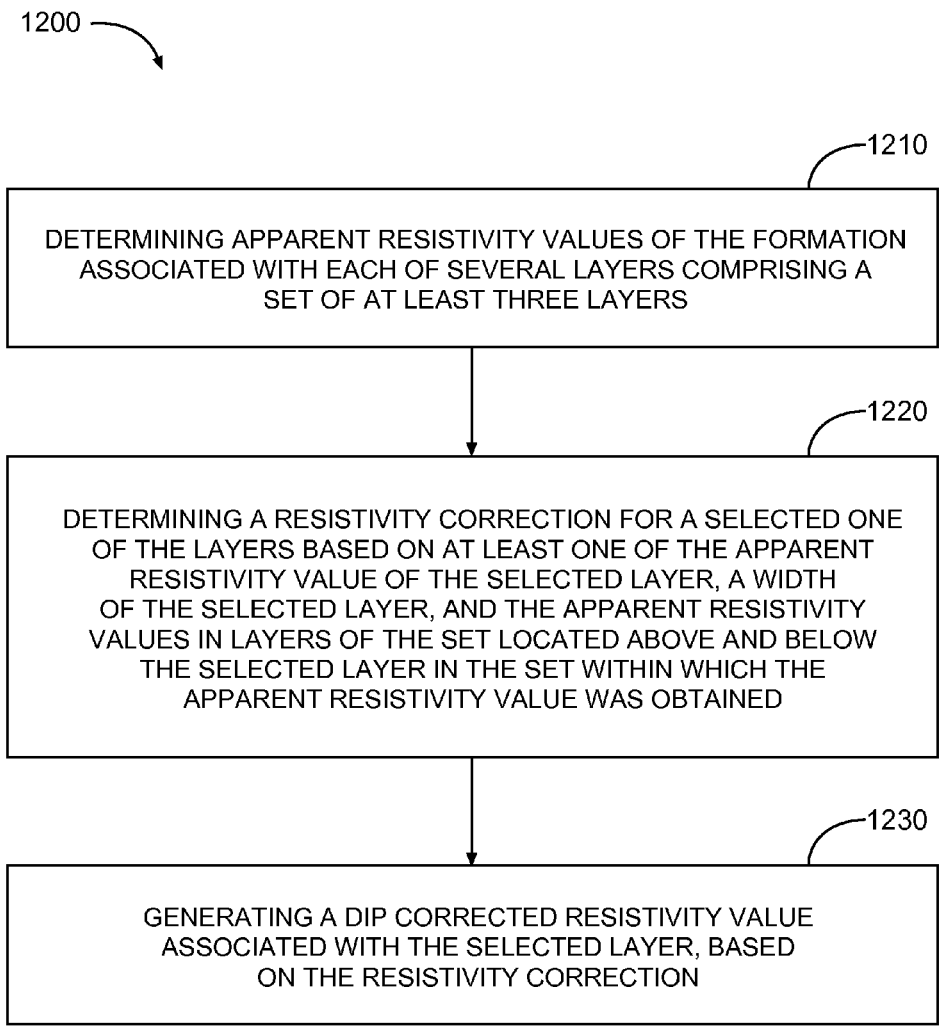
FIG. 12 is a flowchart illustrating a method of evaluating a formation in accordance with some embodiments.

FIG. 12 is a flowchart illustrating a method 1200 for evaluating a formation in accordance with some embodiments. The processing unit 320 can implement operations of method 1200, although various embodiments are not limited thereto.

Example method 1200 starts at block 1210 with obtaining apparent resistivity values of the formation associated with each of several layers comprising a set of at least three layers. The processing unit 320 can determine apparent resistivity values as described above with respect to FIGS. 4-6.

Example method 1200 continues at block 1220 with determining a resistivity correction for a selected one of the layers based on at least one of the apparent resistivity values of the selected layer, a width of the selected layer, and the apparent resistivity values in layers of the set located above and below the selected layer in the set within which the apparent resistivity value was obtained. The processing unit 320 can determine resistivity corrections in a manner similar to that described above with respect to FIG. 5. For example, the processing unit 320 can perform a heuristic correction method or the processing unit 320 can retrieve resistivity corrections from a lookup table as described above with respect to operation 430-4 (FIG. 5).

Example method 1200 continues at block 1230 with generating a dip corrected resistivity value associated with the selected layer, based on the resistivity correction. The processing unit 320 can generate this dip correction in a manner similar to or identical to the process described above with respect to operations 450-1 and 450-2 (FIG. 4).

As described above, the dip correction methods can include an additive method, which adds or subtracts corrections that are generated based on a first sub-model and a second sub-model, and a multiplicative method, which multiplies or divides corrections that are generated based on the first sub-model and the second sub-model. The processing unit 320 can generate the first sub-model, based on an obtained dip angle, and the second sub-model based on a substantially zero dip angle. The processing unit 320 can generate these sub-models by performing a vertical one-dimensional (V1D) inversion. The processing unit 320 can generate the first sub-model and the second sub-model for a first area around a sub-array of the induction tool 305. The processing unit 320 can apply the first sub-model and the second sub-model to a second area, which includes the first area, around the induction tool 305. For example, a first A (FIG. 2) can be included in a larger second area B (FIG. 2), where B extends further into the formation, higher in the borehole, etc., than area A.

The processing unit 320 can generate a first dip effect based on the additive method and a second dip effect based on the multiplicative method.

The example method 1200 can also include obtaining a dip angle of the formation, and receiving a plurality of raw measurements of a formation parameter from an induction tool, each measurement obtained in response to energy propagated into the formation at frequency of a plurality of frequencies of propagated energy.

The example method 1200 can also include performing skin effect correction on the plurality of measurements to generate skin effect-corrected data and generating a model of the formation using the skin effect corrected data and the dip angle. The model can be an estimated model with various parameter estimations, to include location information of a boundary between at least two of the several layers. The model can be similar to that described above with respect to operations 430-2 through 430-5 (FIG. 5). The processing unit 320 can perform block 1220 for determining the resistivity correction based on the estimated model. For example, the processing unit 320 can determining a midpoint of the selected layer based on the location information in the estimated model. The processing unit 320 can in turn determine an apparent resistivity value of the selected layer or any other layer based on, for example, an average value over a plurality of points in the apparent resistivity log or on a value corresponding to the midpoint of the selected layer.

The processing unit 320 can correct the location information responsive to a determination that the dip angle, provided to the processing unit 320, is above a threshold. The processing unit 320 can generate a corrected model with corrected location information. The processing unit 320 can determine or regenerate resistivity correction based on the corrected model.

The processing unit 320 can perform skin effect correction by combining a plurality of frequency measurements for each subarray of the induction tool 305. In various embodiments, the example method 1200 can include other corrections or adjustments, for example, borehole correction.

The example method 1200 can further include the processing unit 320 controlling a drilling operation based on the dip correction or on output data of any other block or operation of method 1200. The example method 900 can include providing data, for example, data representative of the fluid invasion, for publication to a user display.

Figure 13:
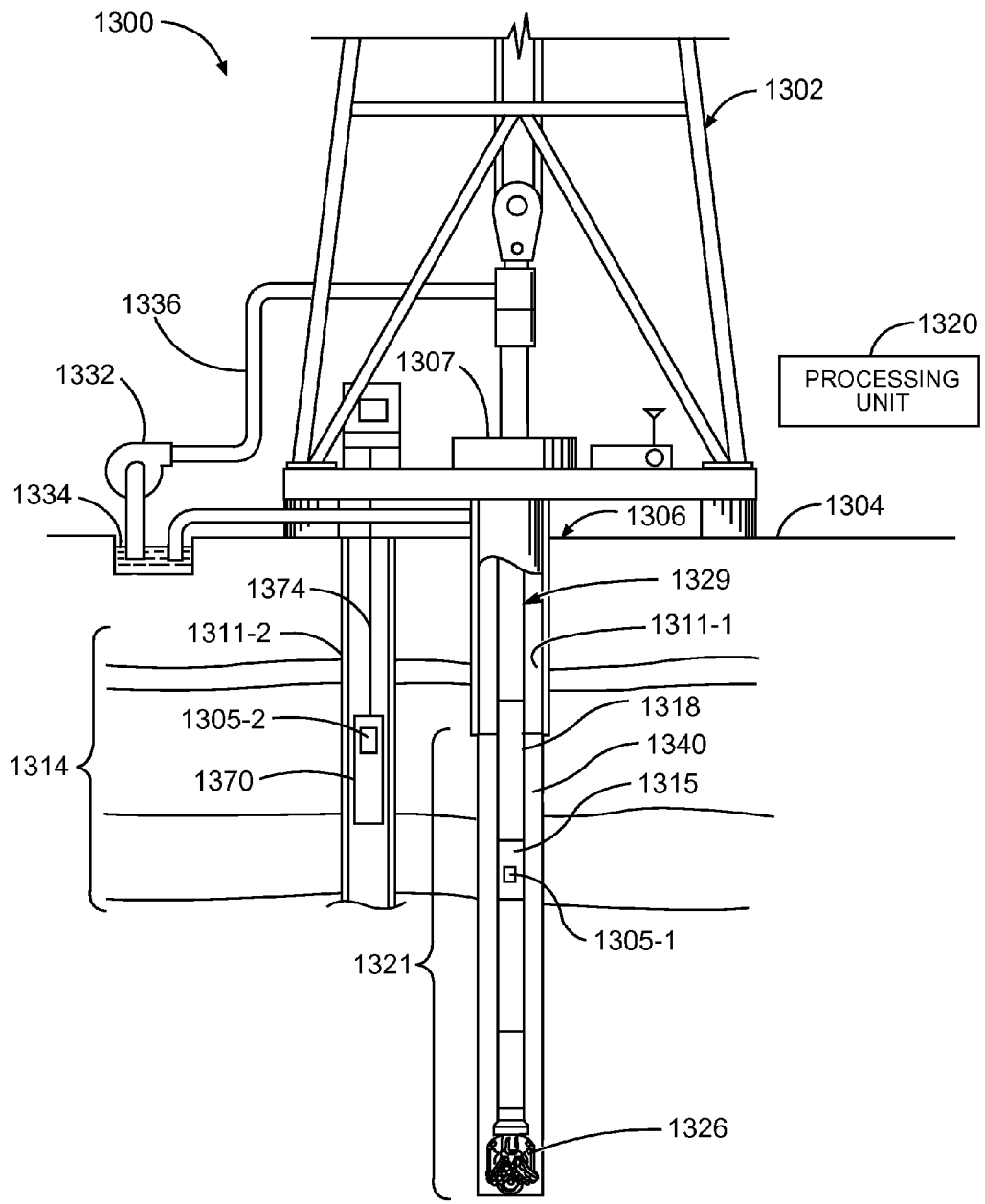
FIG. 13 depicts an example system at a drilling site, where the system is operable to control an induction tool to conduct measurements in wellbores and to implement dip correction, in accordance with various embodiments.

FIG. 13 depicts an embodiment of a system 1300 at a drilling site, where the system 1300 includes an apparatus operable to control an induction tool, including an MCI induction tool or any other type of induction tool, to obtain measurements in a wellbore and to perform dip correction in accordance with some embodiments. The system 1300 can include a tool 1305-1, 1305-2, or both 1305-1 and 1305-2 having an arrangement of transmitter antennas and receiver antennas operable to make measurements that can be used for a number of drilling tasks including, but not limited to, processing induction data. The tools 1305-1 and 1305-2 can be identical to or similar to a tool architecture or combinations of tool architectures discussed herein, including control units and processing units operable to perform processing schemes in a manner identical to or similar to processing techniques discussed herein. The tools 1305-1, 1305-2, or both 1305-1 and 1305-2 can be distributed among the components of system 1300. The tools 1305-1 and 1305-2 can include functionalities and components of control units, transmitters, receivers, and processing units discussed herein. The tools 1305-1 and 1305-2 can be structured and fabricated in accordance with various embodiments, as taught herein.

The system 1300 can include a drilling rig 1302 located at a surface 1304 of a well 1306 and a string of drill pipes, that is, drill string 1329, connected together so as to form a drilling string that is lowered through a rotary table 1307 into a wellbore or borehole 1311-1. The drilling rig 1302 can provide support for the drill string 1329. The drill string 1329 can operate to penetrate rotary table 1307 for drilling the borehole 1311-1 through subsurface formations 1314. The drill string 1329 can include a drill pipe 1318 and a bottom hole assembly 1321 located at the lower portion of the drill pipe 1318.

The bottom hole assembly 1321 can include a drill collar 1316 and a drill bit 1326. The drill bit 1326 can operate to create the borehole 1311-1 by penetrating the surface 1304 and the subsurface formations 1314. The bottom hole assembly 1321 can include the tool 1305-1 attached to the drill collar 1316 to conduct measurements to determine formation parameters. The tool 1305-1 can be structured for an implementation as a MWD system such as a LWD system.

The housing containing the tool 1305-1 can include electronics to initiate measurements from selected transmitter antennas and to collect measurement signals from selected receiver antennas. Such electronics can include a processing unit to provide an analysis of induction data over a standard communication mechanism for operating in a well. Alternatively, electronics can include a communications interface to provide measurement signals collected by the tool 1305-1 to the surface 1304 over a standard communication mechanism for operating in a well, where a processing unit 1320 can analyze these measurements signals at the surface 1304 to provide analysis of induction data, including MCI data. The acquisition, processing, and analysis of measurement signals and induction data may include any one or more of the algorithms and methods described herein.

During drilling operations, the rotary table 1307 can rotate the drill string 1329. In addition to, or alternatively, the bottom hole assembly 1321 can also be rotated by a motor (e.g., a mud motor) that is located downhole. The drill collar 1316 can add weight to the drill bit 1326. The drill collar 1316 also can stiffen the bottom hole assembly 1321 to allow the bottom hole assembly 1321 to transfer the added weight to the drill bit 1326, and in turn, assist the drill bit 1326 in penetrating the surface 1304 and the subsurface formations 1314.

During drilling operations, a mud pump 1332 can pump drilling fluid (sometimes known by those of ordinary skill in the art as "drilling mud") from a mud pit 1334 through a hose 1336 into the drill pipe 1318 and down to the drill bit 1326. The drilling fluid can flow out from the drill bit 1326 and be returned to the surface 1304 through an annular area 1340 between the drill pipe 1318 and the sides of the borehole 1311-1. The drilling fluid may then be returned to the mud pit 1334, where such fluid is filtered. In some embodiments, the drilling fluid can be used to cool the drill bit 1326, as well as to provide lubrication for the drill bit 1326 during drilling operations. Additionally, the drilling fluid may be used to remove subsurface formation cuttings created by operating the drill bit 1326.

In various embodiments, the tool 1305-2 may be included in a tool body 1370 coupled to a logging cable 1374 such as, for example, for wireline applications. The tool body 1370 containing the tool 1305-2 can include electronics to initiate measurements from selected transmitter antennas and to collect measurement signals from selected receiver antennas. Such electronics can include a processing unit to provide analysis of MCI data or other induction data over a standard communication mechanism for operating in a well. Alternatively, electronics can include a communications interface to provide measurement signals collected by the tool 1305-2 to the surface over a standard communication mechanism for operating in a well, where these measurements signals can be analyzed at a processing unit 1320 at the surface to provide analysis of MCI data or other induction data. The logging cable 1374 may be realized as a wireline (multiple power and communication lines), a mono-cable (a single conductor), or a slick-line (no conductors for power or communications), or other appropriate structure for use in the borehole 1311-2. Though FIG. 13 depicts both an arrangement for wireline applications and an arrangement for LWD applications, the system 1300 may be structured to provide only one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method for evaluating a formation, the method comprising:
   obtaining a dip angle of the formation;
   obtaining apparent resistivity values of the formation associated with each of several layers comprising a set of at least three layers;
   generating a first sub-model of the formation based on the dip angle of the formation;
   generating a second sub-model of the formation based on a substantially zero dip angle;
   determining a resistivity correction for a selected one of the layers based on at least one of the apparent resistivity value of the selected layer, a width of the selected layer, the apparent resistivity values in layers of the set located above and below the selected layer in the set within which the apparent resistivity value was obtained, the first sub-model, and the second sub-model; and generating a dip-corrected resistivity value associated with the selected layer based on the resistivity correction.

2. The method of claim 1, further comprising:

receiving a plurality of raw measurements of a formation parameter from an induction tool, each raw measurement of the plurality of raw measurements obtained in response to energy propagated into the formation at a frequency;

performing skin effect correction on the plurality of raw measurements to generate skin effect-corrected data; and generating an estimated model of the formation using the skin effect-corrected data and the dip angle, wherein determining the resistivity correction is based on the estimated model.

3. The method of claim 2, wherein the estimated model includes location information of a boundary between at least two of the several layers.

4. The method of claim 3, further comprising:

determining a midpoint of the selected layer based on the location information, wherein the apparent resistivity value of the selected layer is based on
an average value in an apparent resistivity log for a plurality of points in the apparent resistivity log, or
a value corresponding to the midpoint of the selected layer.

5. The method of claim 3, further comprising:

correcting the location information responsive to a determination that the dip angle is above a threshold to generate a corrected model; and determining a second resistivity correction based on the corrected model.

6. The method of claim 2, wherein performing skin effect correction comprises combining a plurality of frequency measurements for each subarray of the induction tool.

7. The method of claim 1, further comprising:

generating dip-effect corrected raw data using an additive correction or a multiplicative correction, the additive correction including a summation or subtraction of outputs of the first sub-model and the second sub-model, and the multiplicative correction including a multiplication or division based on outputs of the first sub-model and the second sub-model; and generating a log of a property of the formation using the dip-effect corrected raw data.

8. The method of claim 7, wherein additive correction or multiplicative correction is used based on an expected relative accuracy of the additive correction and the multiplicative correction.

9. The method of claim 1, further including controlling a drilling operation based on the dip-corrected resistivity value.

10. A logging system including:

an induction tool configured to propagate energy into a formation, and to provide a plurality of raw measurements of a formation parameter responsive to the propagated energy; and a processor coupled to the induction tool and configured to:
obtain apparent resistivity values associated with each of several layers comprising a set of at least three layers;

determine a resistivity correction for a selected one of the layers based on at least one of the apparent resistivity value of the selected layer, a width of the selected layer, the apparent resistivity values in layers of the set located above and below the selected layer in the set within which the apparent resistivity value was obtained, and a formula comprising ratios between the resistivity values and widths of the layers; and apply the resistivity correction to obtain a dip-corrected resistivity value associated with the selected layer.

11. The logging system of claim 10, wherein the induction tool includes multicomponent induction (MCI) tool.

12. The logging system of claim 11, wherein the induction tool includes at least one single-axis array.

13. The logging system of claim 10, wherein the induction tool includes a transmitter and a plurality of receivers, each receiver of the plurality of receivers spaced at a different distance from the transmitter, and wherein the processor is to select a measurement reading of a shortest distance receiver of the induction tool as the apparent resistivity value.

14. The logging system of claim 10, further comprising a memory to store a look-up table to associate resistivity corrections with widths of the layers in the set of at least three layers, and wherein the processor is to retrieve resistivity corrections from the look-up table.

15. The logging system of claim 10, further comprising:

a display for displaying data representative of the dip-corrected resistivity value; and a user input device to receive a user input responsive to the displaying.

16. A non-transitory machine-readable storage device having instructions stored thereon, which, when performed by a machine, cause the machine to perform operations, the operations comprising:

obtaining resistivity values in a formation at each of several layers comprising a set of at least three layers;

determining a resistivity correction for a selected one of the resistivity values based on a measured resistivity value of the selected one, a width of the layer in the set within which the measured resistivity value was obtained, the resistivity values in layers of the set located above and below the layer in the set within which the measured resistivity value was obtained, and a formula comprising ratios between the resistivity values and widths of the layers; and generating a model of the formation to generate a dip-corrected resistivity value based on the resistivity correction.

17. The non-transitory machine-readable storage device of claim 16, wherein the determining the resistivity correction is based on correction values retrieved from a lookup table, the lookup table including combinations of widths and resistivities for three or more layers and corresponding correction values for each combination.

18. The non-transitory machine-readable storage device of claim 16, having further instructions stored thereon, which, when performed by the machine, cause the machine to perform operations, the operations comprising:

providing data representative of the dip-corrected resistivity value to a user display; and receiving user input responsive to the display.

* * * * *